(12) United States Patent
Van Swearingen et al.

(10) Patent No.: US 9,761,959 B2
(45) Date of Patent: Sep. 12, 2017

(54) ULTRASONIC WELD COAXIAL CONNECTOR

(71) Applicant: CommScope Technologies LLC, Hickory, NC (US)

(72) Inventors: Kendrick Van Swearingen, Woodridge, IL (US); Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 279 days.

(21) Appl. No.: 13/875,416

(22) Filed: May 2, 2013

(65) Prior Publication Data

US 2013/0244487 A1 Sep. 19, 2013

Related U.S. Application Data

(60) Continuation-in-part of application No. 12/951,558, filed on Nov. 22, 2010, now Pat. No. 8,826,525, and
(Continued)

(51) Int. Cl.
*H01R 9/05* (2006.01)
*H01R 4/02* (2006.01)
(Continued)

(52) U.S. Cl.
CPC ........... *H01R 4/029* (2013.01); *B23K 20/129* (2013.01); *B23K 26/282* (2015.10); *B23K 26/32* (2013.01); *H01R 9/05* (2013.01); *H01R 43/0207* (2013.01); *B23K 2201/06* (2013.01); *B23K 2201/38* (2013.01); *B23K 2203/08* (2013.01); *B23K 2203/10* (2013.01); *B23K 2203/18* (2013.01); *B29C 65/0672* (2013.01);
(Continued)

(58) Field of Classification Search
CPC ...... H01R 2103/00; H01R 24/38; H01R 9/05; H01R 9/0524
USPC .................................................. 439/578, 583
See application file for complete search history.

(56) References Cited

U.S. PATENT DOCUMENTS 3,245,027 A 4/1966 Ziegler, Jr.
3,665,367 A 5/1972 Keller et al.
(Continued)

FOREIGN PATENT DOCUMENTS

CN 1623254 6/2005
CN 102610973 A 7/2012
(Continued)

OTHER PUBLICATIONS

Sung Hee Kim, International Search Report from related PCT filing PCT/US/2011/046051, Seo-Gu, Daejeon, Republic of South Korea, Feb. 9, 2012.
(Continued)

*Primary Examiner* — Hae Moon Hyeon
(74) *Attorney, Agent, or Firm* — Myers Bigel, P.A.

(57) ABSTRACT

A coaxial connector for interconnection with a coaxial cable with a solid outer conductor by ultrasonic welding is provided with a monolithic connector body with a bore. An annular flare seat is angled radially outward from the bore toward a connector end of the connector; the annular flare seat open to the connector end of the connector. The flare seat may be provided with an annular flare seat corrugation.

11 Claims, 12 Drawing Sheets

Related U.S. Application Data a division of application No. 12/980,013, filed on Dec. 28, 2010, now Pat. No. 8,453,320.

(51) Int. Cl.
| | |
|---|---|
| B23K 20/12 | (2006.01) |
| H01R 43/02 | (2006.01) |
| B23K 26/32 | (2014.01) |
| B23K 26/282 | (2014.01) |
| B29C 65/06 | (2006.01) |
| B29C 65/64 | (2006.01) |
| B29C 65/00 | (2006.01) |
| B23K 101/06 | (2006.01) |
| B23K 101/38 | (2006.01) |
| B23K 103/10 | (2006.01) |
| B29C 65/08 | (2006.01) |
| B29C 65/48 | (2006.01) |
| B23K 103/08 | (2006.01) |
| B23K 103/18 | (2006.01) |

(52) U.S. Cl.
CPC ............ B29C 65/082 (2013.01); B29C 65/48 (2013.01); B29C 65/4855 (2013.01); B29C 65/645 (2013.01); B29C 66/5344 (2013.01); B29C 66/742 (2013.01)

(56) References Cited

U.S. PATENT DOCUMENTS

| | | | |
|---|---|---|---|
| 4,176,909 A | 12/1979 | Prunier | |
| 4,521,642 A | 6/1985 | Vives | |
| 4,746,305 A | 5/1988 | Nomura | |
| 4,867,370 A | 9/1989 | Welter et al. | |
| 5,046,952 A | 9/1991 | Cohen et al. | |
| 5,154,636 A | 10/1992 | Vaccaro | |
| 5,186,644 A | 2/1993 | Pawlicki et al. | |
| 5,203,079 A | 4/1993 | Brinkman et al. | |
| 5,284,449 A | 2/1994 | Vaccaro | |
| 5,299,939 A | 4/1994 | Walker et al. | |
| 5,354,217 A | 10/1994 | Gabel et al. | |
| 5,561,900 A | 10/1996 | Hosler, Sr. | |
| 5,796,315 A | 8/1998 | Gordon et al. | |
| 5,823,824 A | 10/1998 | Mitamura et al. | |
| 6,007,378 A | 12/1999 | Oeth | |
| 6,032,835 A | 3/2000 | Burt | |
| 6,093,043 A | 7/2000 | Gray et al. | |
| 6,471,545 B1 | 10/2002 | Hosler, Sr. | |
| 6,588,646 B2 | 7/2003 | Loprire | |
| 6,607,399 B2 | 8/2003 | Endo et al. | |
| 6,752,668 B2 | 6/2004 | Koch, Jr. | |
| 6,776,620 B2 | 8/2004 | Noda | |
| 6,793,095 B1 | 9/2004 | Dulisse et al. | |
| 6,814,625 B2 | 11/2004 | Richmond et al. | |
| 6,837,751 B2 | 1/2005 | Vanden Wymelenberg et al. | |
| 6,932,644 B1 | 8/2005 | Taylor | |
| 6,955,562 B1 * | 10/2005 | Henningsen | 439/578 |
| 7,044,785 B2 | 5/2006 | Harwath et al. | |
| 7,134,190 B2 | 11/2006 | Bungo et al. | |
| 7,144,274 B2 | 12/2006 | Taylor | |
| 7,217,154 B2 | 5/2007 | Harwath | |
| 7,275,957 B1 * | 10/2007 | Wlos et al. | 439/583 |
| 7,335,059 B2 * | 2/2008 | Vaccaro | 439/578 |
| 7,347,738 B2 | 3/2008 | Hsieh et al. | |
| 7,520,779 B2 | 4/2009 | Arnaud et al. | |
| 7,607,942 B1 | 10/2009 | Van Swearingen | |
| 7,632,143 B1 * | 12/2009 | Islam | 439/583 |
| 7,677,812 B2 | 3/2010 | Castagna | |
| 7,705,238 B2 | 4/2010 | Van Swearingen | |
| 7,731,529 B1 * | 6/2010 | Islam | 439/583 |
| 7,819,302 B2 | 10/2010 | Bolser et al. | |
| 8,174,132 B2 | 5/2012 | Van Swearingen | |
| 8,453,320 B2 * | 6/2013 | Van Swearingen et al. | 29/828 |
| 2003/0137372 A1 | 7/2003 | Fehrenbach et al. | |
| 2010/0288819 A1 | 11/2010 | Huenig et al. | |
| 2011/0201232 A1 * | 8/2011 | Islam | 439/583 |
| 2012/0129383 A1 * | 5/2012 | Swearingen | 439/449 |
| 2012/0129390 A1 * | 5/2012 | Van Swearingen et al. | 439/578 |
| 2013/0095695 A1 * | 4/2013 | Van Swearingen | 439/578 |

FOREIGN PATENT DOCUMENTS

| | | |
|---|---|---|
| DE | 42 10 547 C1 | 6/1993 |
| EP | 0495467 | 8/1996 |
| EP | 1956687 | 8/2008 |
| EP | 2144338 | 1/2010 |
| EP | 2 219 267 A1 | 8/2010 |
| JP | 2002310117 A | 10/2002 |

OTHER PUBLICATIONS

Chinese Office Action for CN 201380057933.8, dated Jun. 30, 2016, 10 pages.

European Examination Report Corresponding to Patent Application No. 11 843 870.4, dated Mar. 10, 2017; 5 Pages.

* cited by examiner

ULTRASONIC WELD COAXIAL CONNECTOR

CROSS REFERENCE TO RELATED APPLICATIONS

This application is a division of U.S. Utility patent application Ser. No. 12/980,013, titled "Method of Interconnecting a Coaxial Connector to a Coaxial Cable via Ultrasonic Welding", filed Dec. 28, 2010 by Kendrick Van Swearingen and Nahid Islam, which is a continuation-in-part of commonly owned co-pending U.S. Utility patent application Ser. No. 12/951,558, titled "Laser Weld Coaxial Connector and Interconnection Method", filed Nov. 22, 2010 by Ronald A. Vaccaro, Kendrick Van Swearingen, James P. Fleming, James J. Wlos and Nahid Islam, currently pending and hereby incorporated by reference in its entirety.

BACKGROUND

1. Field of the Invention

This invention relates to electrical cable connectors. More particularly, the invention relates to a coaxial cable connector interconnectable with a coaxial cable via ultrasonic welding.

2. Description of Related Art

Coaxial cable connectors are used, for example, in communication systems requiring a high level of precision and reliability.

To create a secure mechanical and optimized electrical interconnection between the cable and the connector, it is desirable to have generally uniform, circumferential contact between a leading edge of the coaxial cable outer conductor and the connector body. A flared end of the outer conductor may be clamped against an annular wedge surface of the connector body via a coupling body. Representative of this technology is commonly owned U.S. Pat. No. 6,793,529 issued Sep. 21, 2004 to Buenz. Although this type of connector is typically removable/re-useable, manufacturing and installation is complicated by the multiple separate internal elements required, interconnecting threads and related environmental seals.

Connectors configured for permanent interconnection via solder and/or adhesive interconnection are also well known in the art. Representative of this technology is commonly owned U.S. Pat. No. 5,802,710 issued Sep. 8, 1998 to Bufanda et al. However, solder and/or adhesive interconnections may be difficult to apply with high levels of quality control, resulting in interconnections that may be less than satisfactory, for example when exposed to vibration and/or corrosion over time.

Competition in the coaxial cable connector market has focused attention on improving electrical performance and long term reliability of the cable to connector interconnection. Further, reduction of overall costs, including materials, training and installation costs, is a significant factor for commercial success.

Therefore, it is an object of the invention to provide a coaxial connector and method of interconnection that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Aluminum has been applied as a cost-effective alternative to copper for the conductors in coaxial cables. However, aluminum oxide surface coatings quickly form upon air-exposed aluminum surfaces. These aluminum oxide surface coatings may degrade traditional mechanical, solder and/or conductive adhesive interconnections.

The inventors have recognized that increasing acceptance of coaxial cable with solid outer conductors of aluminum and/or aluminum alloy enables connectors configured for interconnection via ultrasonic welding between the outer conductor and a connector body which may also be cost effectively provided, for example, formed from aluminum and/or aluminum alloy.

An ultrasonic weld may be formed by applying ultrasonic vibrations under pressure in a join zone between two parts desired to be welded together, resulting in local heat sufficient to plasticize adjacent surfaces that are then held in contact with one another until the interflowed surfaces cool, completing the weld. An ultrasonic weld may be applied with high precision via a sonotrode and/or simultaneous sonotrode ends to a point and/or extended surface. Where a point ultrasonic weld is applied, successive overlapping point welds may be applied to generate a continuous ultrasonic weld.

Figures 1, 2:
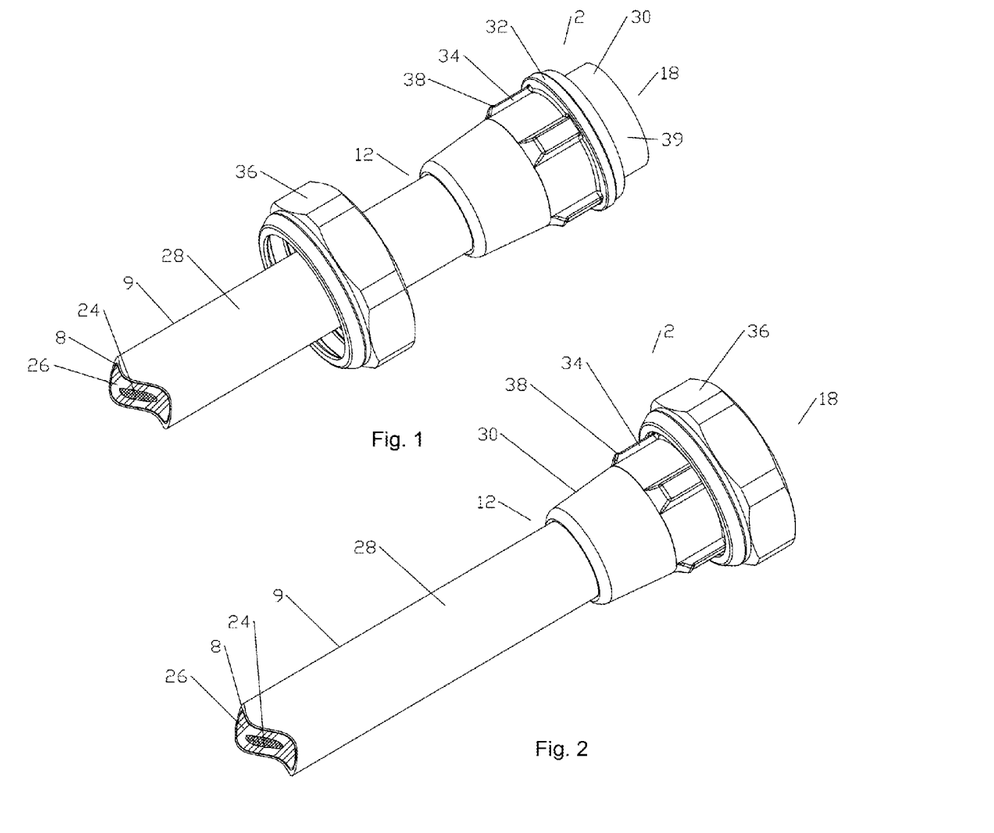
FIG. 1 is a schematic external isometric view of an exemplary embodiment of a coaxial connector installed upon a coaxial cable with a coupling nut spaced away from the connector along the cable for connector-to-cable interconnection.
FIG. 2 is a schematic isometric view of the coaxial connector of FIG. 1 installed upon a coaxial cable, with the coupling nut seated upon the coaxial connector.
Figure 3:
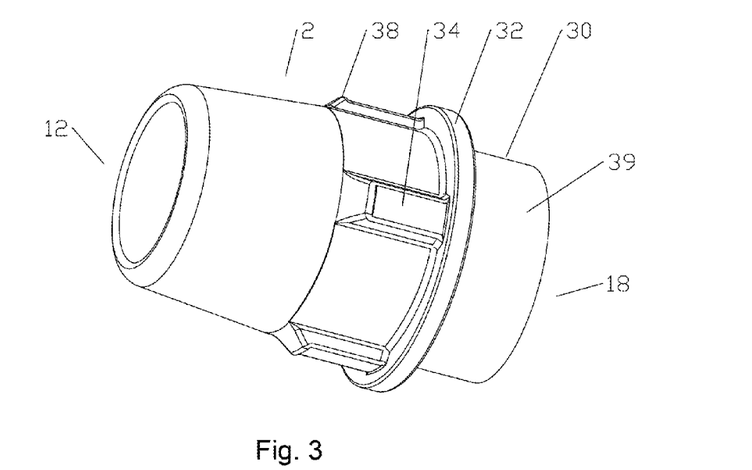
FIG. 3 is a schematic isometric view of the coaxial connector of FIG. 1.
Figure 4:
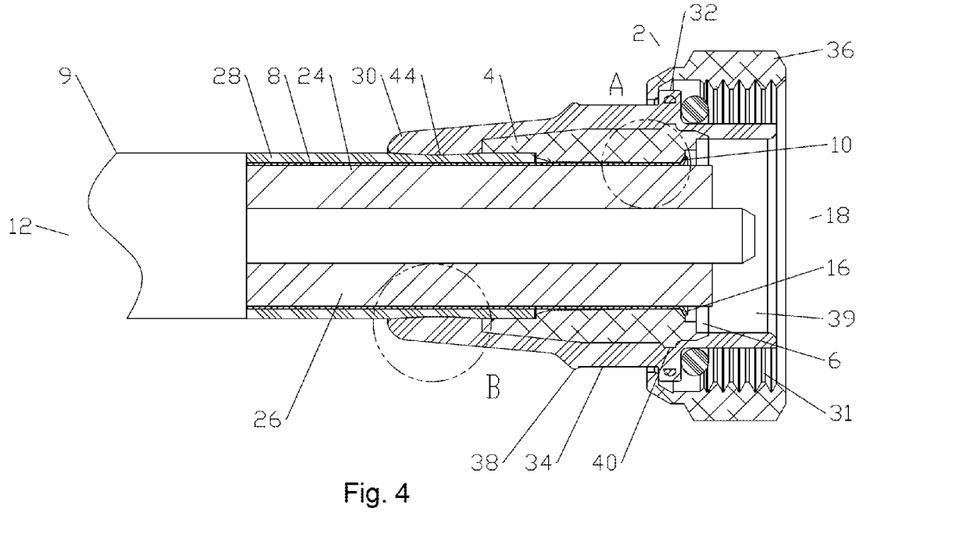
FIG. 4 is a schematic partial cross section side view of the connector of FIG. 2.
Figure 5:
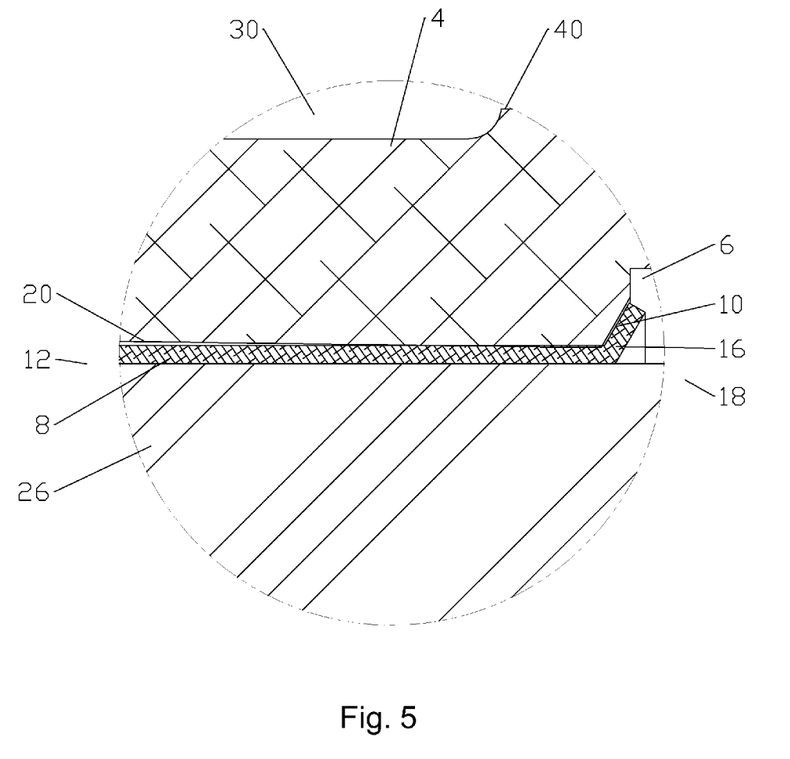
FIG. 5 is an enlarged view of area A of FIG. 4.

Exemplary embodiments of an ultrasonic weldable coaxial connector 2 are demonstrated in FIGS. 1-17. As best shown in FIG. 4, a unitary connector body 4 is provided with a bore 6 dimensioned to receive the outer conductor 8 of a coaxial cable 9 therein. As best shown in FIG. 5, a flare seat 10 angled radially outward from the bore 6 toward a connector end 18 of the connector body 4 is open to the connector end of the coaxial connector 2 providing a mating surface to which a leading end flare 16 of the outer conductor 8 may be ultrasonically welded by the sonotrode of an ultrasonic welder.

One skilled in the art will appreciate that connector end 18 and cable end 12 are applied herein as identifiers for respective ends of both the connector and also of discrete elements of the connector described herein, to identify same and their respective interconnecting surfaces according to their alignment along a longitudinal axis of the connector between a connector end 18 and a cable end 12.

Figure 6:
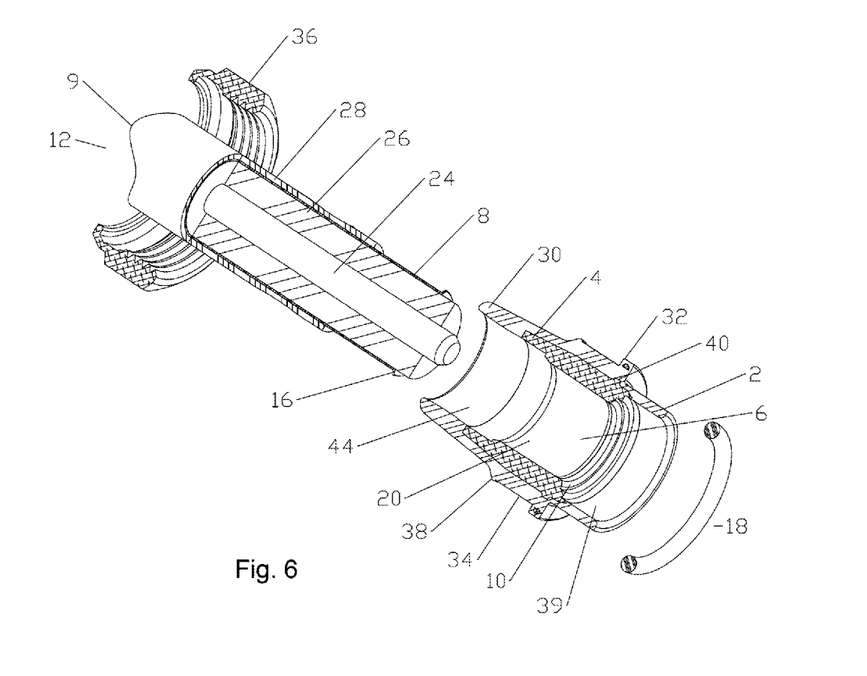
FIG. 6 is a schematic exploded isometric partial cut-away view of the connector and cable of FIG. 1.

Prior to interconnection via ultrasonic welding, the leading end of the coaxial cable 9 may be prepared, as best shown in FIG. 6, by cutting the coaxial cable 9 so that the inner conductor 24 extends from the outer conductor 8. Also, dielectric material 26 between the inner conductor 24 and outer conductor 8 may be stripped back and a length of the outer jacket 28 removed to expose desired lengths of each. The cable end 12 is inserted through the bore 6 and an annular flare operation performed on a leading edge of the outer conductor 8; the resulting leading end flare 16 may be angled to correspond to the angle of the flare seat 10 with respect to a longitudinal axis of the coaxial connector 2. By performing the flare operation against the flare seat 10, the resulting leading end flare 16 can be formed with a direct correspondence to the flare seat 10 angle.

Figure 7:
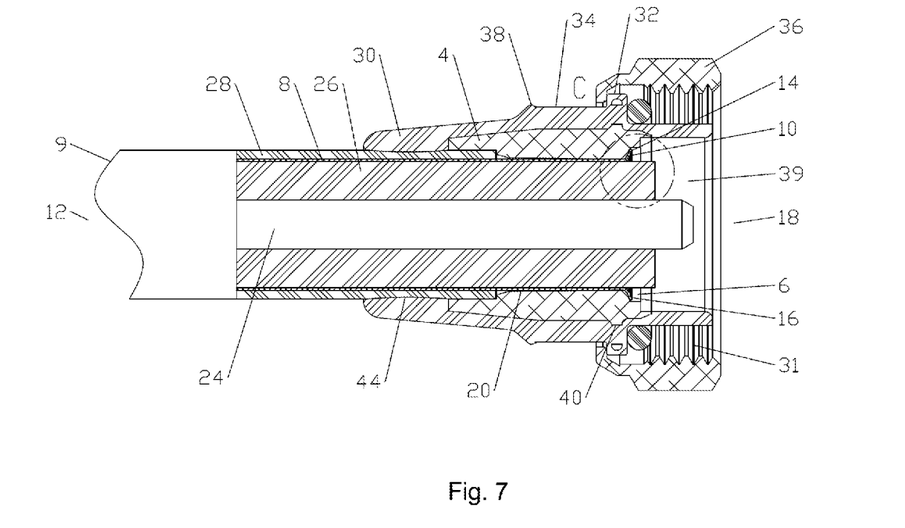
FIG. 7 is a schematic cross section side view of an alternative embodiment of a coaxial connector with a corrugated flare seat.
Figure 8:
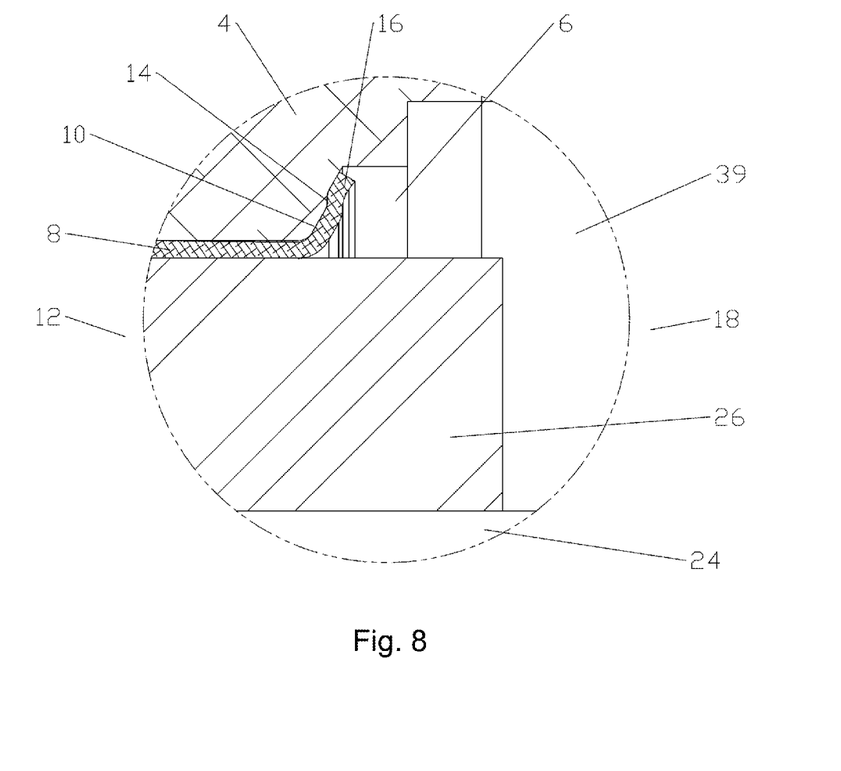
FIG. 8 is an enlarged view of area C of FIG. 7.
Figure 9:
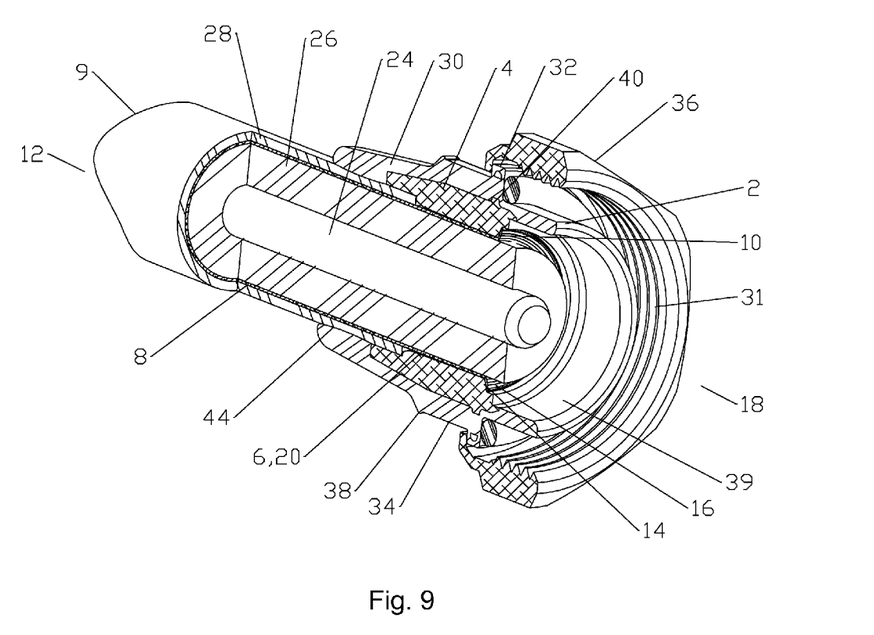
FIG. 9 is a schematic partial cut-away isometric view of the connector of FIG. 7.

The flare seat 10 may alternatively be formed with surface features, such as a flare seat corrugation 14, demonstrated for example in FIGS. 7-9 as an annular corrugation. Surface features provide increased surface area along which the ultrasonic weld may be applied, increasing the strength of the resulting interconnection, without requiring a corresponding increased diameter of the leading end flare 16 which may have a negative impact on an impedance discontinuity characteristic of the resulting coaxial connector interconnection. Further surface features may include, for example, annular or radial knurls or other protrusion configurations.

Ultrasonic welding may be performed, for example, utilizing torsional vibration. In torsional vibration ultrasonic-type friction welding, a torsional vibration is applied to the interconnection via a sonotrode applied to the cable end 12 of the leading end flare 16, while the coaxial connector 2 and flare seat 10 therewithin are held static. The torsional vibration generates a friction heat which plasticizes the contact surfaces between the leading end flare 16 and the flare seat 10. Where torsional vibration ultrasonic-type friction welding is utilized, a suitable frequency and torsional vibration displacement, for example between 20 and 40 KHz and 20-35 microns, may be applied.

Because the localized abrasion of the ultrasonic welding process can break up any aluminum oxide surface coatings in the immediate weld area, no additional care may be required with respect to removing or otherwise managing the presence of aluminum oxide on the interconnection surfaces.

Figure 10:
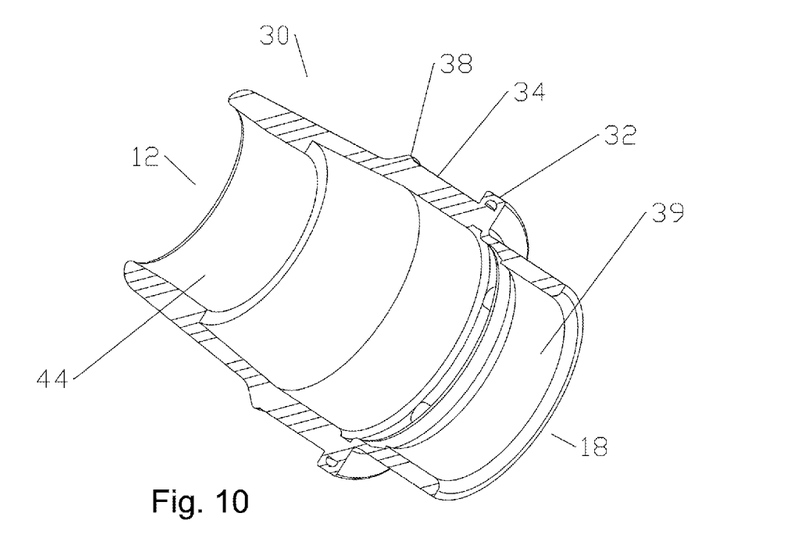
FIG. 10 is a schematic isometric cut-away view of the overbody of FIG. 5.

An overbody 30, as shown for example in FIG. 10, may be applied to the connector body 4 as an overmolding of polymeric material. The overbody 30 increases cable to connector torsion and pull resistance. The overbody 30 may also provide connection interface structure at the connector end 18 and further reinforcing support at the cable end 12, enabling significant reductions in the size of the connector body 4, thereby reducing overall material costs.

Depending upon the applied connection interface 31, demonstrated in the exemplary embodiments herein as a standard 7/16 DIN interface, the overbody 30 may be provided with an overbody flange 32 and longitudinal support ridges 34 for a coupling nut 36. The coupling nut 36 is retained upon the support ridges 34 at the connector end 18 by an overbody flange 32 and at the cable end 12 by a retention spur 38 provided on at least one of the support ridges 34. The retention spur 38 may be angled toward the connector end 18, allowing the coupling nut 36 to be placed over the cable 9 initially spaced away from the coaxial connector 2 during interconnection (see FIG. 1), but then allowing the coupling nut 36 to be passed over the retention spur 38 and onto the support ridges 34 from the cable end 12, to be thereafter retained upon the support ridges 34 by the retention spur(s) 38 (see FIG. 2) in close proximity to the connector interface 31 for connector to connector mating. The support ridges 34 reduce polymeric material requirements of the overbody 30 while providing lateral strength to the connector/interconnection 2 as well as alignment and retention of the coupling nut 36.

The overbody 30 may also extend from the connector end 18 of the connector body 4 to provide portions of the selected connector interface 31, such as an alignment cylinder 39 of the 7/16 DIN interface, further reducing metal material requirements of the connector body 4.

Figure 11:
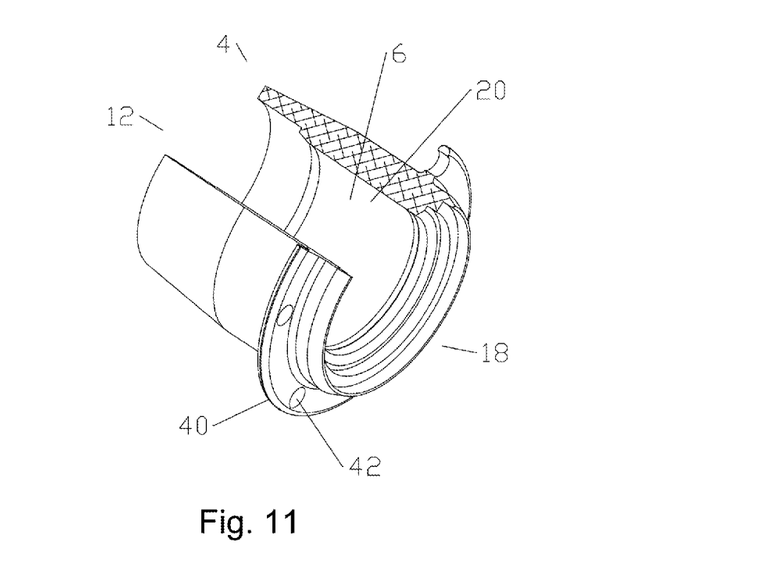
FIG. 11 is a schematic isometric partial cut-away view of the connector body of FIG. 5.
Figure 12:
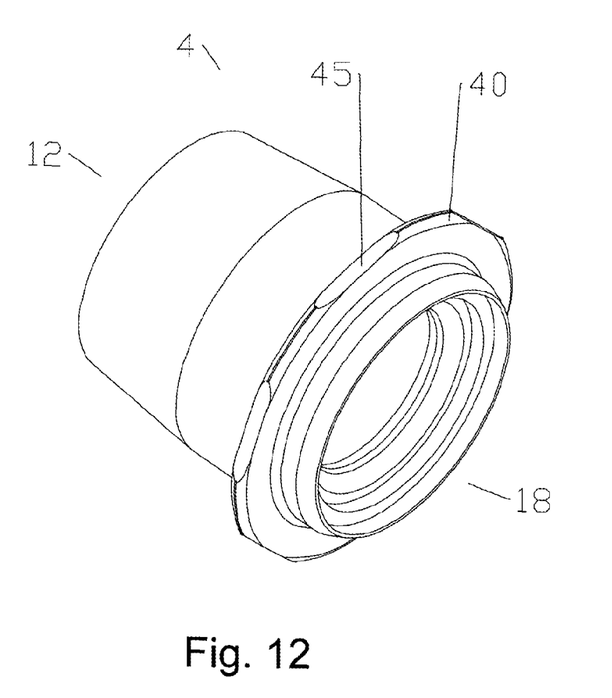
FIG. 12 is a schematic isometric view of an alternative connector body with notches on a flange of the connector body.
Figure 13:
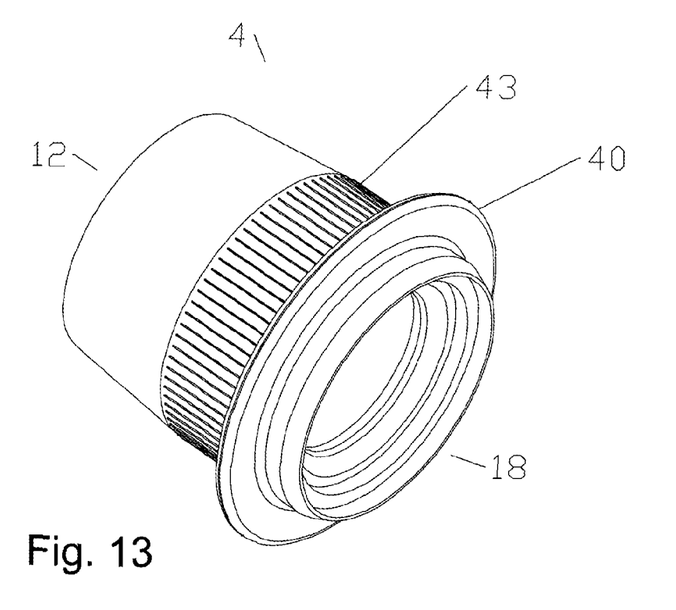
FIG. 13 is a schematic isometric view of an alternative connector body with longitudinal knurls on the connector body outer diameter.

The overbody flange 32 may be securely keyed to a connector body flange 40 of the connector body 4 and thereby with the connector body 4 via one or more interlock apertures 42 such as holes, longitudinal knurls 43, grooves, notches 45 or the like provided in the connector body flange 40 and/or outer diameter of the connector body 4, as demonstrated in FIGS. 11-13. Thereby, as the polymeric material of the overbody 30 flows into the interlock apertures 42 during overmolding, upon curing the overbody 30 is permanently coupled to and rotationally interlocked with the connector body 4.

Figure 14:
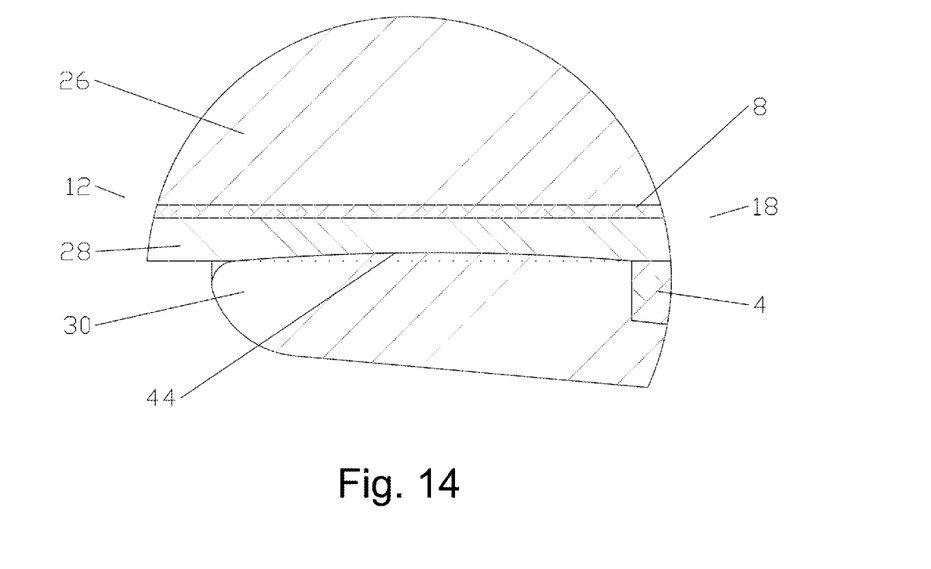
FIG. 14 is an enlarged view of area B of FIG. 4.
Figure 15:
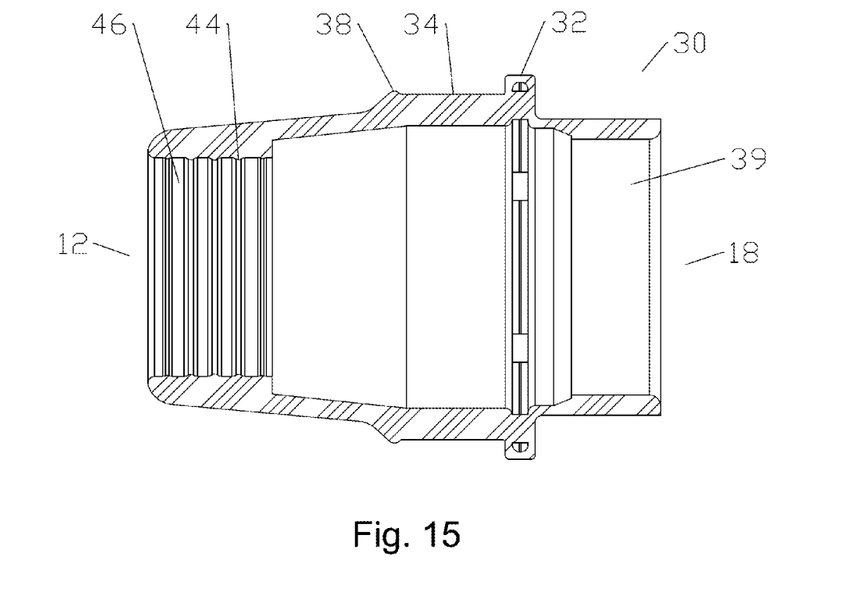
FIG. 15 is a schematic cross section side view of an alternative overbody with corrugation on an inner diameter of the cable end.
Figure 16:
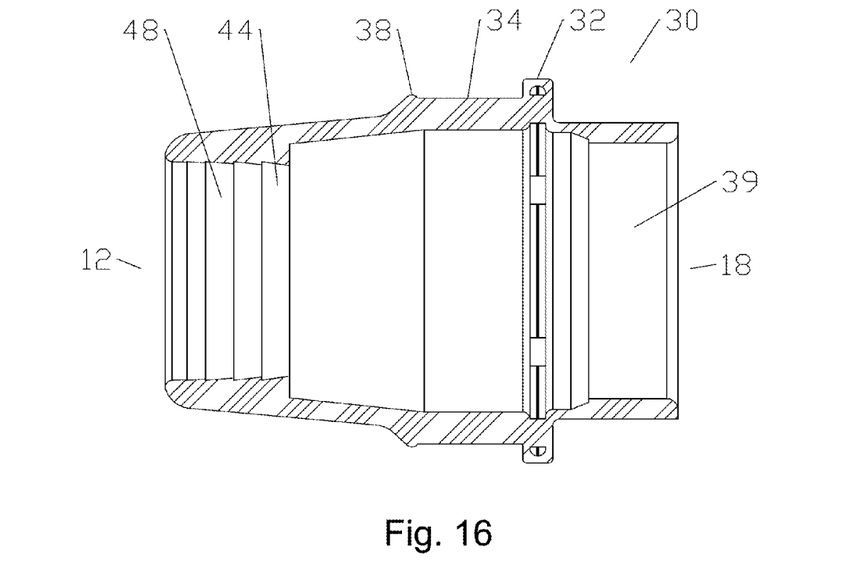
FIG. 16 is a schematic cross section side view of an alternative overbody with a stepped surface on an inner diameter of the cable end.
Figure 17:
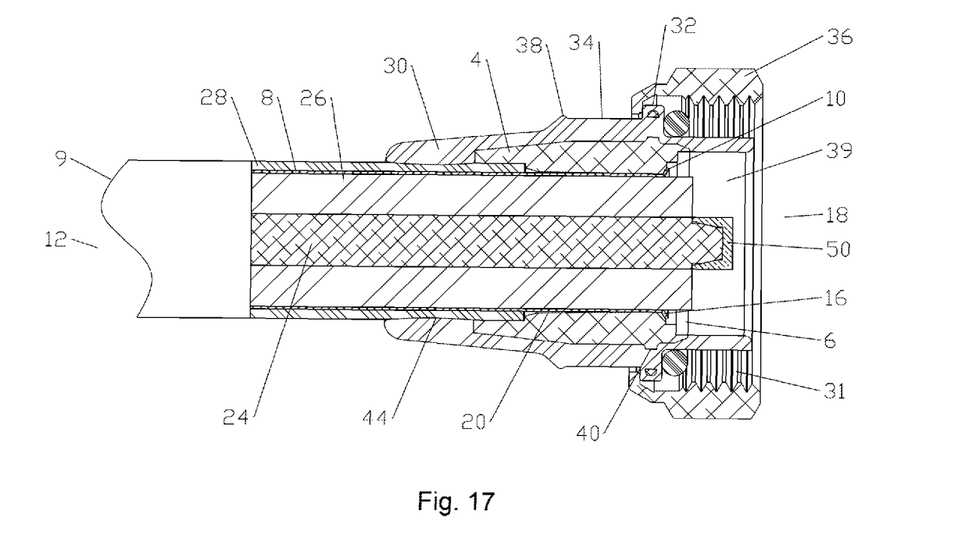
FIG. 17 is a schematic cross section side view of a coaxial connector embodiment with an inner conductor end cap.

As best shown in FIG. 14, the cable end 12 of the overbody 30 may be dimensioned with an inner diameter friction surface 44 proximate that of the coaxial cable outer jacket 28, enabling polymeric friction welding between the overbody 30 and the outer jacket 28, as the connector body 4 and outer conductor are rotated with respect to each other, thereby eliminating the need for environmental seals at the cable end 12 of the connector/cable interconnection. During friction welding, the coaxial connector 2 is rotated with respect to the cable 9. Friction between the friction surface 44 and the outer diameter of the outer jacket 28 heats the respective surfaces to a point where they begin to soften and intermingle, sealing them against one another. The outer jacket 28 and/or the inner diameter of the overbody 30 may be provided as a series of spaced apart annular peaks of a contour pattern such as a corrugation 46, as shown for example in FIG. 15, or a stepped surface 48, as shown for example in FIG. 16, to provide enhanced friction, allow voids for excess friction weld material flow and to add key locking for additional strength. Alternatively, the overbody 30 may be sealed against the outer jacket 28 with an adhesive/sealant or may be overmolded upon the connector body 4 after interconnection with the outer conductor 8, the heat of the injected polymeric material bonding the overbody 30 with and/or sealing against the outer jacket 28.

The inner conductor 24 extending from the prepared end of the coaxial cable 9 may be selected to pass through to the connector end 18 as a portion of the selected connection interface 31, for example as shown in FIG. 4. If the selected coaxial cable 9 has an inner conductor 24 that has a larger diameter than the inner conductor portion of the selected connector interface 31, the inner conductor 24 may be ground at the connector end 18 to the required diameter.

Although a direct pass through inner conductor 24 advantageously eliminates interconnections, for example with the spring basket interconnection with a traditional coaxial connector inner contact, such may introduce electrical performance degradation such as PIM. Where the inner conductor 24 is also aluminum material some applications may require a non-aluminum material connection point at the inner contact/inner conductor of the connection interface 31. As shown for example in FIG. 17, a center cap 50, for example formed from a metal such as brass or other desired metal, may be applied to the end of the inner conductor 24, also by friction or ultrasonic welding. To apply the center cap 50, the end of the inner conductor 24 is ground to provide a pin corresponding to the selected socket geometry of the center cap 50. To allow material inter-flow during welding attachment, the socket geometry of the center cap 50 and or the end of the inner conductor 24 may be formed to provide material gaps.

One skilled in the art will appreciate that the connector and interconnection method disclosed has significant material cost efficiencies and provides a permanently sealed interconnection with reduced size and/or weight requirements.

| Table of Parts | |
|---|---|
| 2 | coaxial connector |
| 4 | connector body |
| 6 | bore |
| 8 | outer conductor |
| 9 | cable |
| 10 | flare seat |
| 12 | cable end |
| 14 | flare seat corrugation |
| 16 | leading end flare |
| 18 | connector end |
| 20 | bore sidewall |
| 24 | inner conductor |
| 26 | dielectric material |
| 28 | outer jacket |
| 30 | overbody |
| 31 | connection interface |
| 32 | overbody flange |
| 34 | support ridge |
| 36 | coupling nut |
| 38 | retention spur |
| 39 | alignment cylinder |
| 40 | connector body flange |
| 42 | interlock aperture |
| 43 | longitudinal knurl |
| 44 | friction surface |
| 45 | notch |
| 46 | corrugation |
| 48 | stepped surface |
| 50 | center cap |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A coaxial connector for interconnection with a coaxial cable with a solid outer conductor, comprising:
a monolithic connector body with a bore;
an annular flare seat angled radially outward from the bore toward a connector end of the connector; the annular flare seat open to the connector end of the connector; and a coupling nut disposed at the connector end of the connector for engaging a mating connector.

2. The connector of claim 1, wherein the flare seat is provided with an annular flare seat corrugation.

3. The connector of claim 1, wherein a diameter of the bore proximate the flare seat decreases to an interference fit with an outer diameter of the outer conductor.

4. The connector of claim 1, further including an overbody of polymeric material on an outer diameter of the connector body.

5. The connector of claim 4, wherein the overbody includes an alignment cylinder of a connector interface at the connector end of the connector.

6. The connector of claim 4, wherein the overbody includes a plurality of longitudinal support ridges extending from an outer diameter of the overbody to less than an inner diameter of the coupling nut dimensioned to seat upon the support ridges.

7. The connector of claim 6, wherein the coupling nut is retained on the support ridges between a flange of the overbody and an outward extending retention spur proximate a cable end of at least one of the support ridges.

8. The connector of claim 4, wherein the overbody extends from the cable end of the connector body, an inner diameter of the overbody extending from a cable end of the connector body provided as a friction surface with an interference fit upon an outer diameter of a jacket of the coaxial cable.

9. The connector of claim 8, wherein the friction surface is provided as a series of spaced apart annular peaks of a contour pattern of the inner diameter of the overbody.

10. The connector of claim 4, further including a rotational interlock between the overbody and the connector body.

11. The connector of claim 10, wherein the rotational interlock is a plurality of interlock apertures provided in a connector body flange protruding from an outer diameter of the connector body.

\* \* \* \* \*